(12) United States Patent
Bony et al.

(10) Patent No.: US 12,625,360 B2
(45) Date of Patent: May 12, 2026

(54) NIGHT VISION DEVICE WITH INTEGRATED DISPLAY

(71) Applicant: PHOTONIS FRANCE, Brive (FR)

(72) Inventors: Pierre-Yves Bony, Brive (FR); Nicolas Laurent, Brive (FR); Geoffroy Deltel, Merignac (FR); Arend Hiddema, AB Roden (NL)

(73) Assignee: PHOTONIS FRANCE, Brive (FR)

( * ) Notice: Subject to any disclaimer, the term of this patent is extended or adjusted under 35 U.S.C. 154(b) by 293 days.

(21) Appl. No.: 18/684,327

(22) PCT Filed: Oct. 28, 2022

(86) PCT No.: PCT/FR2022/052052
§ 371 (c)(1),
(2) Date: Feb. 16, 2024

(87) PCT Pub. No.: WO2023/073329
PCT Pub. Date: May 4, 2023

(65) Prior Publication Data
US 2025/0147299 A1 May 8, 2025

(30) Foreign Application Priority Data
Oct. 29, 2021 (FR) ..................................... 2111564

(51) Int. Cl.
*G02B 23/12* (2006.01)
*G02B 23/18* (2006.01)
(52) U.S. Cl.
CPC ............. *G02B 23/12* (2013.01); *G02B 23/18* (2013.01)
(58) Field of Classification Search
None
See application file for complete search history.

(56) References Cited

U.S. PATENT DOCUMENTS 4,142,101 A * 2/1979 Yin ....................... A61B 6/4258
378/102
5,305,142 A * 4/1994 Phillips .................. G02B 23/12
359/357
(Continued)

FOREIGN PATENT DOCUMENTS

EP 3851898 A1 7/2021

OTHER PUBLICATIONS

International Search Report and Written Opinion, corresponding International Application No. PCT/FR2022/052052, mailing date Jan. 24, 2023.

*Primary Examiner* — Derek S. Chapel
(74) *Attorney, Agent, or Firm* — MARSHALL, GERSTEIN & BORUN LLP

(57) ABSTRACT

A night vision device includes a binocular body in which is mounted, along an optical axis, an objective lens, a light intensifier tube, a light guide, and an eyepiece lens. The light intensifier tube includes a photocathode, a microchannel wafer, a phosphor screen intended to deliver a night vision image and a light guide having an input side contiguous to the phosphor screen and an output side intended to form an image in the focal plane of the eyepiece lens. The light intensifier tube further includes a display in the form of a thin glass plate or of a thin film comprising light-emitting elements, the thin plate/the thin film being directly arranged on the output side of the light guide. A power supply and control module, housed within the tube body, at the periphery of the light guide, delivers the respective bias voltages of the different elements of the light intensifier tube and controls the luminescence of the light-emitting elements of the display.

15 Claims, 7 Drawing Sheets

(56)  References Cited

U.S. PATENT DOCUMENTS

| | | | | |
|---|---|---|---|---|
| 5,703,354 | A * | 12/1997 | Wannagot | G02B 23/12 |
| | | | | 359/411 |
| 6,072,565 | A * | 6/2000 | Porter | G01C 3/08 |
| | | | | 348/31 |
| 6,624,414 | B1 * | 9/2003 | Glesener | H01J 31/50 |
| | | | | 313/527 |
| 2004/0196566 | A1 | 10/2004 | Beystrum et al. | |
| 2008/0157000 | A1 | 7/2008 | Shamir et al. | |
| 2008/0297885 | A1 | 12/2008 | Pochapsky et al. | |
| 2009/0108180 | A1 * | 4/2009 | Saldana | H01J 43/08 |
| | | | | 250/214 VT |
| 2017/0250049 | A1 * | 8/2017 | Pluis | H01J 31/26 |
| 2021/0349301 | A1 * | 11/2021 | Becker | H10K 71/231 |
| 2023/0133988 | A1 * | 5/2023 | Burnsed | G02B 1/002 |
| | | | | 359/400 |
| 2023/0142824 | A1 * | 5/2023 | Burnsed | H04N 13/327 |
| | | | | 359/418 |
| 2024/0105413 | A1 * | 3/2024 | Laurent | G02B 6/06 |
| 2024/0369822 | A1 * | 11/2024 | Moore | G02B 23/125 |

* cited by examiner

NIGHT VISION DEVICE WITH INTEGRATED DISPLAY

TECHNICAL FIELD

The present invention generally concerns the field of night vision devices using a light intensifier tube (also called image intensifier). It applies in particular to night vision binoculars (NVB).

BACKGROUND

Night vision devices are generally used in in theatres of operations of low luminosity, or even darkness, in a hostile civilian or military environment. These night vision devices operate in the visible and near-infrared spectral range.

FIG. 1 schematically shows a conventional night vision device.

The latter is constructed from a binocular body 100, within which are mounted, along an optical axis, an objective lens, 110, a light intensifier tube, 190, and an eyepiece lens 140. Light intensifier tube 190 comprises a photocathode, 121, receiving the light having crossed the objective lens, and converting the photons thus received into photoelectrons, a microchannel wafer or MCP, 122, playing the role of an electron multiplier by generating secondary electrons from the photoelectrons, a phosphor screen, 123, coupled to an anode, converting the flux of secondary electrons into a light flux.

An output light guide, 130, generally formed of a glass block or of a bundle of optical fibers contiguous to the phosphor screen, is intended to form an image in the focal plane of the eyepiece lens, 140. Finally, a power supply module 150 delivers the power supply voltages enabling to bias the different elements forming the light intensifier tube. This power supply module is coupled to a battery arranged outside of the concerned tube.

The user's concentration capacity being generally entirely focused on the observation of the amplified images, it is difficult for them to disperse their attention on a plurality of terminals to take into account additional information (GPS data, itinerary guides, compass, alerts etc.) likely to guide them or to aid them in the mission.

To address this situation, it has been disclosed in document U.S. Pat. No. 11,054,629 to integrate a microdisplay in a conventional night vision device. This microdisplay is arranged orthogonally to the optical axis of the tube, downstream of the light intensifier tube and upstream of the eyepiece lens. The image of the data display is projected onto a glass plate inclined by 45° (or a prism) on the optical axis of the tube. The projected image is combined with that received from the light intensifier tube and the user of the device then perceives the combination of the two images through the eyepiece lens.

While this assembly effectively enables to combine the image of a data display and that of a light intensifier tube within a same device, it cannot be obtained by simple retrofitting of an existing night vision device. Further, the arrangement of the display at the outlet of the tube is not mechanically stable. Finally, the presence of the microdisplay within the device, arranged orthogonally to the tube axis, decreases by its bulk the surface area of the exit pupil and, accordingly, the size of the image seen through the eyepiece lens.

Further, when the luminance at the outlet of the light intensifier tube is low, the user of the night vision device may be dazzled by the display on the data screen. It is thus necessary to balance the intensity of the display and that of the intensifier tube.

An object of the present invention accordingly is to provide a night vision device which does not have the limitations of the state of the art, in particular which may be equipped with a display by simple retrofitting, with no modification of the focal distance of the eyepiece lens and of the objective lens, and with no alteration of its performance, particularly with no decrease in the size of the amplified images. A secondary object of the present invention is to provide such an integrated display night vision device which maintains a good contrast level between the night vision image and the image provided by the display. Finally, another object of the invention is to provide a replacement light intensifier tube enabling to retrofit a conventional night vision device by transforming it into an integrated display night vision device.

SUMMARY OF THE DISCLOSURE

The present invention is defined by a night vision device comprising a binocular body in which are mounted, along an optical axis, an objective lens, a light intensifier tube, and an eyepiece lens, the light intensifier tube comprising a photocathode intended to receive the light having crossed the objective lens and to convert the photons thus received into photoelectrons, a microchannel wafer intended to multiply the photoelectrons received from the photocathode by generating secondary electrons, a phosphor screen intended to deliver a night vision image based on the secondary electrons impacting it, a light guide having an input side contiguous to the phosphor screen and an output side intended to form an image in the focal plane of the eyepiece lens, the night vision device being original in that the light intensifier tube further comprises a display in the form of a thin glass plate or of a thin film comprising light-emitting elements, the thin plate/the thin film being directly arranged on the output side of the light guide, a power supply and control module, housed within the light intensifier tube, at the periphery of the light guide, intended to deliver the respective bias voltages of the photocathode, of the light intensifier, and of the phosphor screen and to control the light-emitting elements of the display.

The light guide may be formed by a glass block or by a bundle of optical fibers bonded to one another.

According to a first embodiment, the display is formed by deposition of a film on at least a portion of the output side, planar or planarized, the deposition being performed by an atomic layer deposition (ALD) technique.

The thin film advantageously comprises a first dielectric layer, a light-emitting film, and a second dielectric layer, the assembly formed by the first dielectric layer, the light-emitting film, and the second dielectric layer being sandwiched between a first array of electrodes arranged in the form of columns and a second array of transparent electrodes organized in rows, orthogonal to the first one.

The light-emitting elements may typically appear in the form of segments.

According to a second embodiment, the display is formed by bonding of a glass plate on at least a portion of the output side, phosphor segments being deposited on the thin plate and individually addressable by conductive tracks.

Whatever the embodiment, according to a first variant, the power supply and control module appears in the form of two distinct units, a first unit having the function of delivering the respective high bias voltages of the photocathode, of the microchannel wafer, and of the phosphor screen and a second unit having the function of controlling the display.

The night vision device may further comprise a communication module coupled to the second unit by means of a bus, said communication module having a wireless radio interface, and supplying information to be displayed to the second unit via said bus, said first unit transmitting to the second unit a signal (D) for controlling the luminance of the light-emitting elements to be displayed.

In the first variant, the night vision device may further comprise a power supply module powering with a low voltage the first and second units, the first unit comprising a voltage multiplier for generating said high bias voltages based on said low voltage.

In this case, the first unit measures the anode current of the phosphor screen and supplies this measurement to the second unit, the second unit controlling the voltage and/or the duty cycle of a signal for biasing the light-emitting elements, to limit the ratio of the luminance of the elements thus displayed to the luminance of the night vision image, to a level within a range of predetermined values.

The second unit advantageously controls the voltage and/or the duty cycle of the signal for biasing the light-emitting elements so that the luminance thereof varies in successive stages, the variation of the luminance of the light-emitting elements following in delayed fashion the variation of the luminance of the night image when the latter increases or decreases.

The second unit may control the voltage and/or the duty cycle of the signal for biasing the light-emitting elements so that the luminance thereof is proportional to the anode current filtered by means of a recursive low-pass filter.

Whatever the previously-mentioned embodiment, in a second variant, the power supply and control module appears in the form of an integrated unit, delivering on the one hand the respective bias voltages of the photocathode, of the microchannel wafer, and of the phosphor screen, and controlling on the other hand the display.

In this case, said integrated unit is adapted to controlling the voltage and/or the duty cycle of the signal for biasing the light-emitting elements so that the luminance thereof is proportional to the anode current filtered by means of a low-pass recursive filter.

The invention further concerns a replacement light intensifier tube, intended to retrofit a night vision device, said night vision device comprising a binocular body in which are mounted, along an optical axis, an objective lens, a light intensifier tube, and an eyepiece lens, said replacement light intensifier tube being intended to replace the light intensifier tube and comprising a photocathode, intended to receive the light having crossed the objective lens and to convert the photons thus received into photoelectrons, a microchannel wafer intended to multiply the photoelectrons received from the photocathode by generating secondary electrons, a phosphor screen intended to deliver a night vision image based on the secondary electrons impacting it, a light guide having an input side contiguous to the phosphor screen and an output side intended to form an image in the focal plane of the eyepiece lens, a display in the form of a thin glass plate or of a thin film comprising light-emitting elements, the thin plate/the thin film being directly arranged on the output side of the replacement light guide, said replacement light intensifier tube further comprising a power supply and control module intended to be housed within the tube body, at the periphery of the light guide, and to deliver the respective bias voltages of the photocathode, of the light intensifier and of the phosphor screen as well as to control the light-emitting elements of the display.

BRIEF DESCRIPTION OF THE DRAWINGS

Other features and advantages of the invention will occur on reading of a preferred embodiment of the invention, in relation with the appended drawings, in which.

DETAILED DESCRIPTION

There will be considered hereafter a night vision device having the general structure disclosed in the state of the art.

In such a device, the input side of the light guide is contiguous to the phosphor screen within the light intensifier tube, and the output side forms an image in the focal plane of the eyepiece lens.

The idea underlying the present invention is to provide on the output side of the light guide a display in the form of a light-emitting thin plate/thin film.

This display enables to overlay the information, for example location, direction information, symbology, or tactical information, for example IFF-type (Identification Friend or Foe) indications, on the night vision image.

FIGS. 2A to 2D schematically show different structural variants of a night vision device according to an embodiment of the invention.

For simplification, there only have been shown in these drawings the module formed by the photocathode, the microchannel wafer, and the phosphor screen, 220, the light guide, 230, the display 260, and the power supply and control unit, 250, enabling to power and to control the different elements of the light intensifier tube as well as of the display.

In all the shown variants, the input side of the light guide is contiguous to the phosphor screen of the light intensifier tube. The light guide has an output side which does not necessarily extend over the entire surface at the output of the guide. The output side may be planar by construction (glass plate for example) or result from a mechanical planarization operation or other (block of optical fibers bonded together for example).

Figures 2A, 2B:
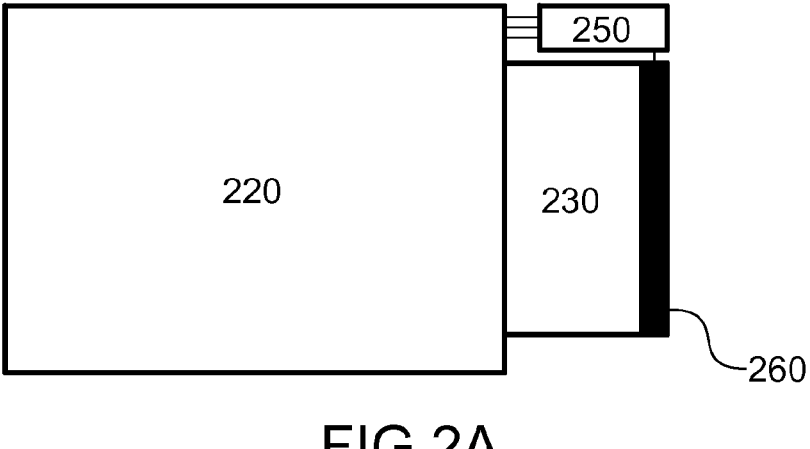
FIGS. 2A to 2D schematically show different structural variants of a night vision device according to an embodiment of the invention.

According to a first alternative embodiment, shown in FIG. 2A and FIG. 2B, the display is formed by a thin glass plate, contiguous to the output side of the light guide.

Phosphor segments are deposited on the thin plate and individually addressable by conductive tracks.

This thin plate may extend over the entire output section of the guide if the latter is planar (FIG. 2A) or a portion, or even the entire planar portion, thereof. For example, in a second variant, the output side may have a meniscus in its central portion and a planar portion in its peripheral portion. The thin plate is then bonded to the planar portion (FIG. 2B).

Figure 2C:
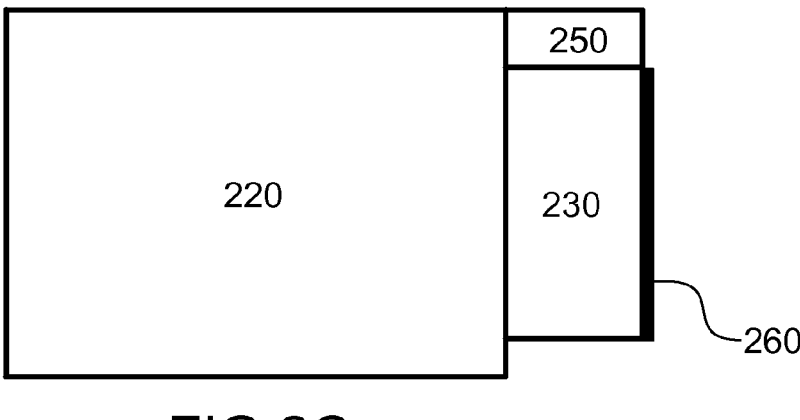
Figure 2D:
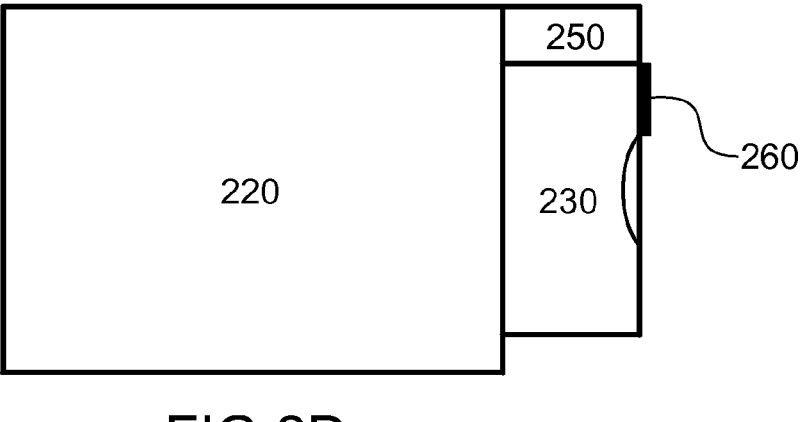

According to a second alternative embodiment, shown in FIG. 2C and FIG. 2D, the display is formed by means of a thin light-emitting film, directly deposited on the output side of the guide, either over its entire surface if the output section is planar (FIG. 2C), or a planar portion thereof (FIG. 2D).

Advantageously, this film may be deposited by atomic layer deposition (ALD) according to the method described in application US-A-2019/0223268 incorporated herein by reference. This method comprises, in particular, the deposition of a first dielectric layer, the deposition of a light-emitting layer made of manganese-doped zinc sulfide (ZnS:Mn) on the first dielectric layer, and eventually the deposition of a second dielectric layer on the light-emitting layer. The first and second dielectric layers are transparent and are for example obtained by alternating sub-layers of alumina ($Al_2O_3$) and sub-layers of zirconium oxide ($ZrO_2$). The assembly formed by the light-emitting layer and the dielectric layers is sandwiched between a first array of transparent electrodes arranged in columns and a second array of transparent electrodes organized in rows, orthogonal to the first one. A pixel or a segment at the intersection of a column electrode and of a row electrode is lit when a potential difference is applied therebetween.

The display may be of array type or of segment type, as known per se. Without prejudice to generality, it will be assumed hereafter that the display is in segments for simplification.

The thickness of the thin plate or of the thin film is selected to be substantially smaller than the depth of field of the eyepiece lens so that the night vision image formed on the output side of the light guide and the image generated by the display are both sharp (or have a same high degree of sharpness) and overlaid, such as seen through the eyepiece lens. Thus, a single setting of the eyepiece lens allows a sharp observation of the night image and of the displayed information.

For eyepiece lenses currently used in night vision binoculars, a plate/film thickness in the order of a few hundred microns, preferably between 100 and 500 μm, typically equal to 300 μm, may be chosen.

Whatever the envisaged variant, the power supply and control module particularly allows the biasing of the segments of the light-emitting film, according to the nature of the information to be displayed and to the desired luminance features.

Figure 3A:
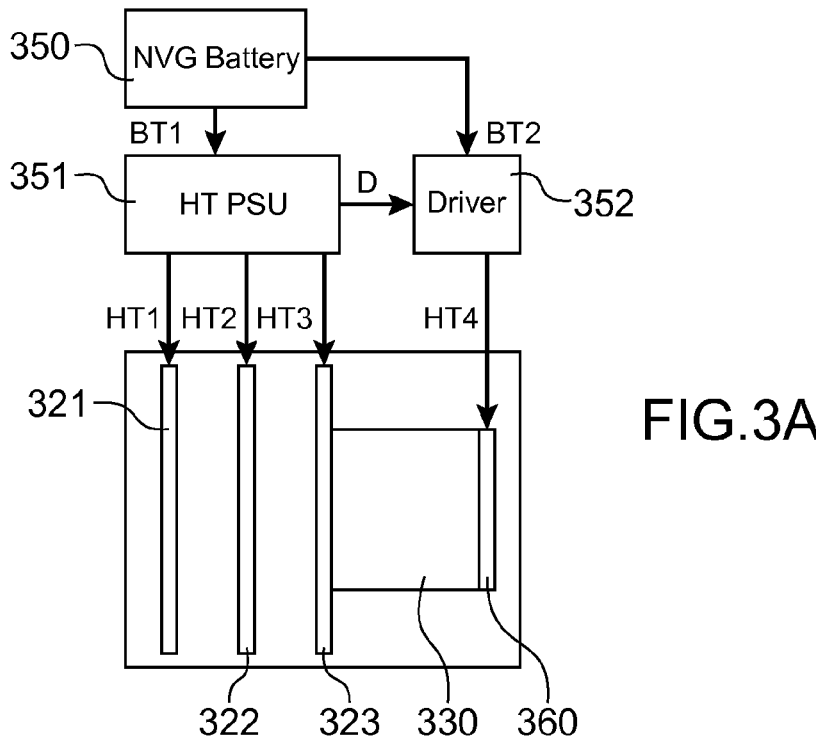
FIGS. 3A and 3B schematically show two variants of a night vision device according to a first embodiment of the invention.
Figure 3B:
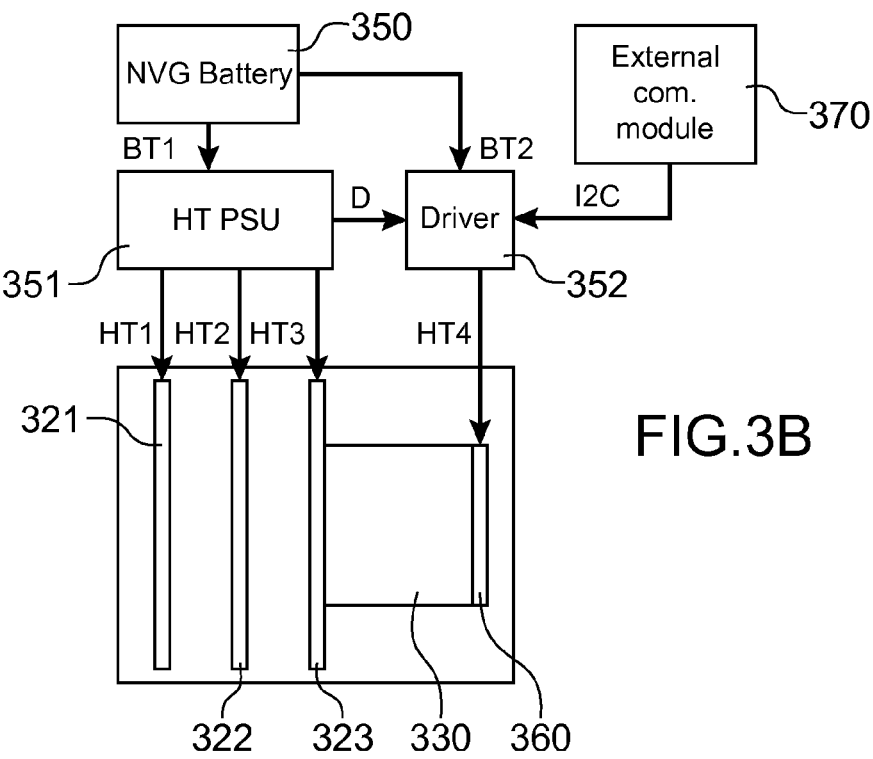

FIGS. 3A and 3B correspond to a first embodiment of the invention where the power supply and control module is dissociated into two distinct units, 351, 352, respectively in charge of the high-voltage power supply of the different elements of the light intensifier, and of the generation of the display control signals.

The high-voltage power supply unit (HT PSU), 351, delivers voltages HT1, HT2 and HT3 respectively to the photocathode, 321, the microchannel wafer, 323, and the phosphor screen, 330, of the light intensifier tube. These high voltages are generated by a voltage multiplier, from a low voltage BT delivered by a simple battery 350.

The control unit, 352, controls display 360, directly located on the output side of the light guide, 330. This control unit may be powered by battery 350 and receive information to be displayed from power supply unit 351.

The variant of FIG. 3B differs from that of FIG. 3A in that the information to be displayed is received by an external communication module, 370, transmitting this information, for example via an I2C bus, after having deciphered them, to control unit 352 which translates them in turn into control signals. These control signals control the display segments of the light-emitting plate/film to form an image on the output side of the light guide.

Figure 3C:
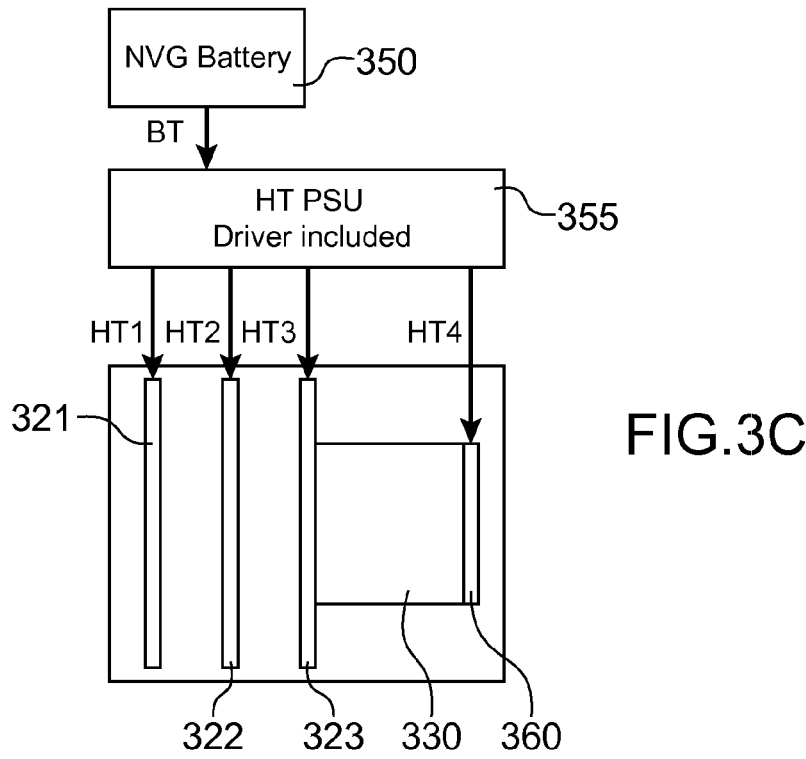
FIGS. 3C and 3D schematically show two variants of a night vision device according to a second embodiment of the invention.
Figure 3D:
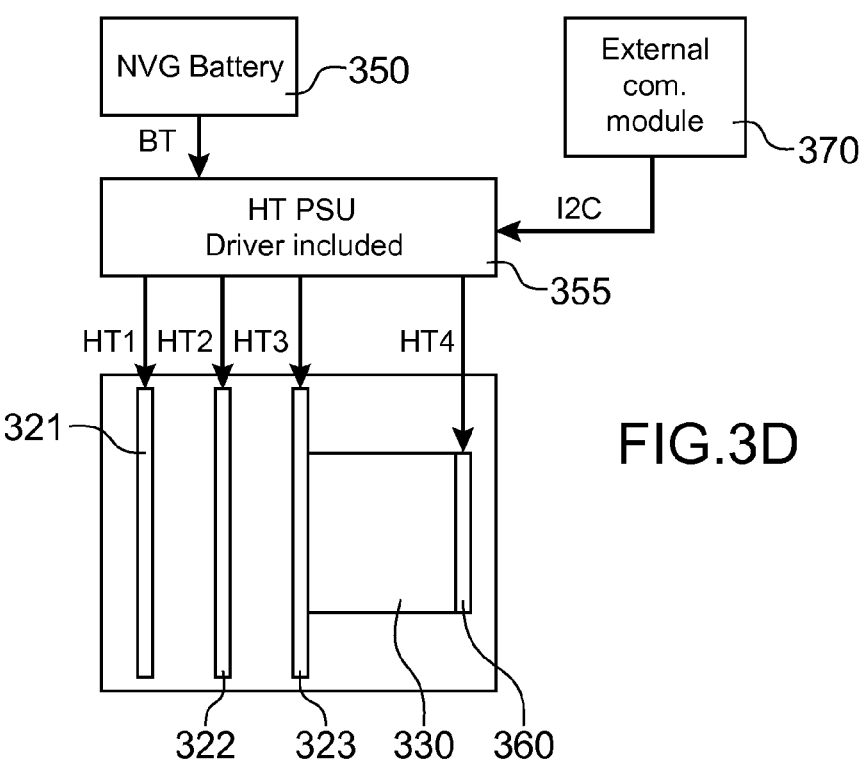

FIGS. 3C and 3D correspond to a second embodiment of the invention where the power supply and control module forms one and the same physical entity.

In other words, the units 351 and 352 of FIGS. 3A and 3B are integrated within a single unit, 355, located at the periphery of the light guide as shown in 250 in FIGS. 2A-2D.

In the first variant of the second embodiment, unit 355 is a standalone unit. It manages high voltages HT1, HT2, and HT3 for the different elements of the light intensifier tube from the low voltage delivered by a battery 350. For this purpose, integrated unit 355 may comprise a voltage multiplier known per se. Integrated unit 355 further generates the control signals, which control the different segments of display 360.

In the second variant, unit 355 receives the information to be displayed from external communication module, 370, via an I2C bus. As in the first embodiment, the external communication module may receive the information to be displayed, if relevant in ciphered form, by means of a radio communication interface.

Whatever the envisaged embodiment and the considered variant, the luminance of the display is advantageously controlled to maintain a limited contrast between the image of the display and the night vision image. More precisely, the ratio of the luminance (or the brightness) of the displayed segments to the luminance of the night vision image is kept lower than a predetermined maximum value. If relevant, this same luminance ratio may also be kept higher than a predetermined threshold value.

Generally, for a constant illumination of the photocathode, the luminance of the night vision image is an increasing function of the anode current, $I_A$, the latter mostly depending on the voltage across the microchannel wafer, $V_{MCP}$, in other words in the present case on HT1 and HT2 and on the duty cycle of the power supply of the photocathode.

The luminance of the segments is, according to the bias voltage between the two arrays of electrodes, from a few tens to a few hundreds of volts. This bias signal is generally pulsed (with a recurrence frequency ranging from a few tens to a few thousands of Hertz). By varying these two parameters (voltage level and duty cycle of the bias signal) or even one of them only, it is possible to adjust the luminance of the display screen.

Figure 3E:
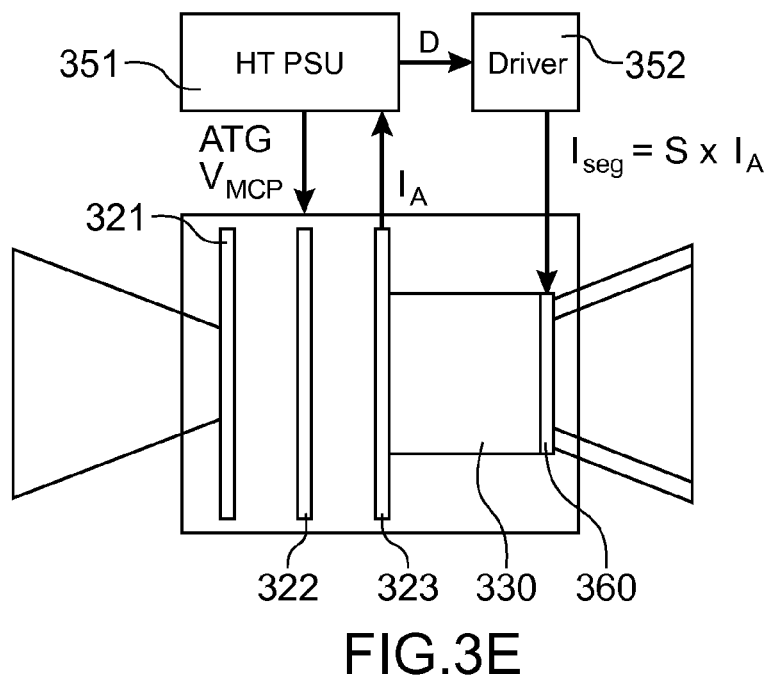
FIGS. 3E and 3F schematically show the principle of contrast regulation in a night vision device, respectively according to the first and the second embodiment of the invention.
Figure 3F:
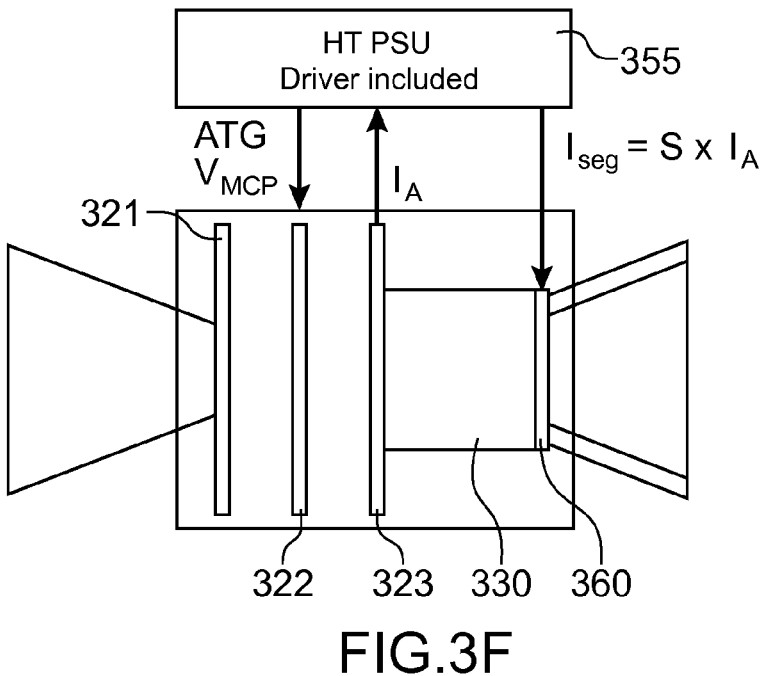

The contrast servocontrol principle is shown in FIGS. 3E and 3F, respectively for the first and the second embodiment.

In the case of the first embodiment, anode current $I_A$ is read by high-voltage power supply unit 351 and the latter accordingly delivers a control signal regulating the bias voltage of the electrode arrays in addition to the control signals of the different segments, to achieve the desired contrast servocontrol.

In the case of the second embodiment, anode current $I_A$ is read by integrated unit 355, which then itself delivers the bias voltage of the electrode arrays.

As previously indicated, the luminance of the displayed segments may be controlled by acting on the level of the bias voltage and/or its duty cycle.

Figure 4:
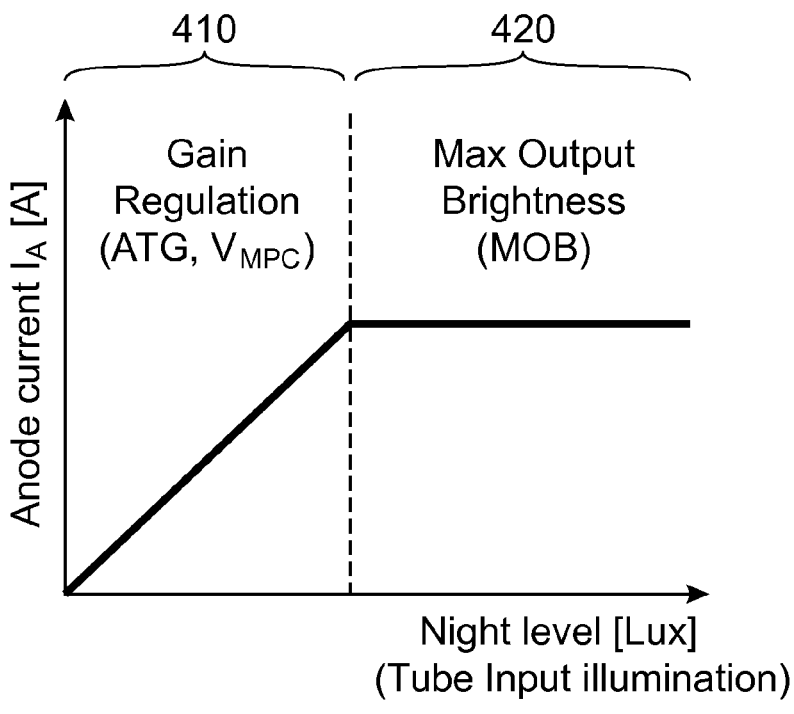
FIG. 4 schematically shows different gain modes of a light intensifier according to the input illumination level.

FIG. 4 schematically shows the variation of the intensity of the anode current, $I_A$, according to the photocathode illumination level.

This diagram shows different gain states according to the illumination level (also called night level) at the input of the light intensifier tube.

In a first state, called linear state, 410, for low night levels (that is, low illumination levels), the high voltages applied to the microchannel wafer and to the photocathode are fixed. The duty cycle of the voltage applied to the photocathode is also fixed, in the order of 100%. In this first mode, the anode current is proportional to the illumination level of the photocathode.

In a second state, called saturation state, 420, occurring at higher illumination levels, the luminance of the night vision image saturates at a predetermined maximum luminance level or MOB (Maximum Output Brightness). The luminance of the intensifier tube is held at said maximum level by varying both the high voltage applied to the microchannel wafer and the pulsed voltage duty cycle applied to the photocathode.

Be it in the linear state or the saturation state described hereabove, the voltage (and/or duty cycle) level of the signal for biasing the segments is controlled (are controlled) so that the contrast between the displayed image, more precisely the displayed segments, and the night vision image remains lower than a maximum value and advantageously within a range of predetermined values. According to a variant, this control is performed so that the contrast level varies within an interval centered on an average value, defined by a lower limiting value and an upper limiting value.

Figure 5:
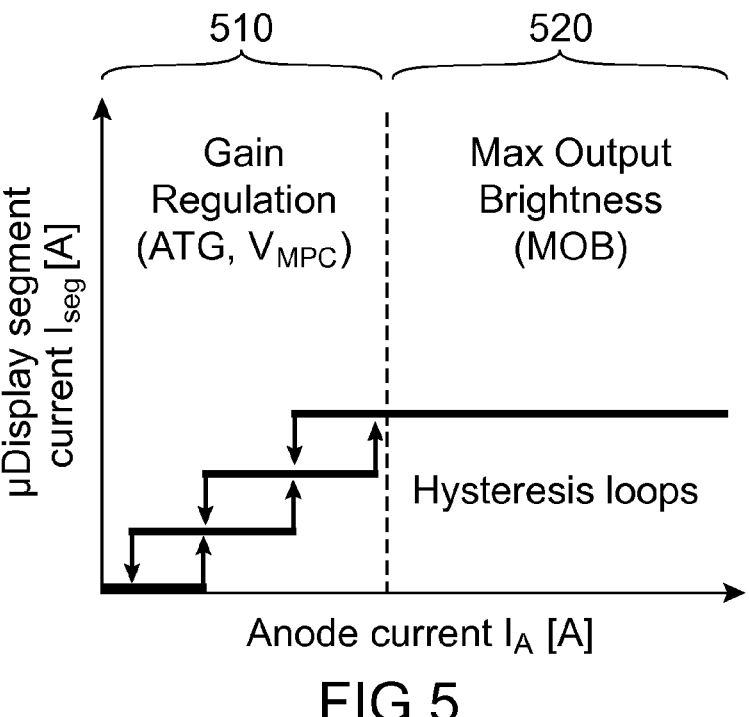
FIG. 5 schematically shows the controlling of the current of the segments of the display according to the anode current of a night vision device according to a specific embodiment of the invention.

FIG. 5 schematically shows the variation of the current in the display according to the anode current for a night vision device according to an embodiment of the invention.

The voltage level of the signal for biasing the display is controlled so that the contrast level between the displayed image and the night vision image remains within an interval centered on an average value.

The two operating states of the light intensifier can be distinguished again.

In the saturation state, 520, the amplitude of the bias voltage (and/or the duty cycle of the bias signal when the latter is pulsed) is kept substantially constant to respect a set point contrast level, S. This set point level may be set to a predetermined value by the manufacturer or set by the user according to their visual comfort. The level (and possibly the duty cycle in the case of a pulsed signal) of the voltage for biasing the segments of the display is set so as to obtain the set point contrast level. In this case, the current between the two electrodes biasing a segment is such that $I_{seg}=S \cdot I_A$. When the bias signal is pulsed, an average current of the segment is to be taken into account instead of the instantaneous current.

In the linear state, 510, it is also possible to control the level of the bias voltage (and/or its duty cycle) to have relation $I_{seg}=S \cdot I_A$. However, to avoid too fast fluctuations of $I_{seg}$ when the luminance of the night image varies (dynamic image, moving user or target), it may be relevant to only vary intensity $I_{seg}$ in successive stages. In other words, the variations of intensity $I_{seg}$ may only follow the variations of the anode current with a delay, the successive stages then being different according to whether the luminance of the night image increases or decreases. The hysteresis cycles corresponding to the different stages are illustrated in FIG. 5.

According to a variant, the voltage level and/or the duty cycle of the bias signal will be adjusted so that $I_{seg}=S \cdot LP(I_A)$ where $LP(I_A)$ is the anode current filtered by a low-pass filter, advantageously by a recursive low-pass of first order. The forgetting coefficient of the recursive filter may be, here again, set to a predetermined value by the manufacturer or set by the user.

Figure 1:
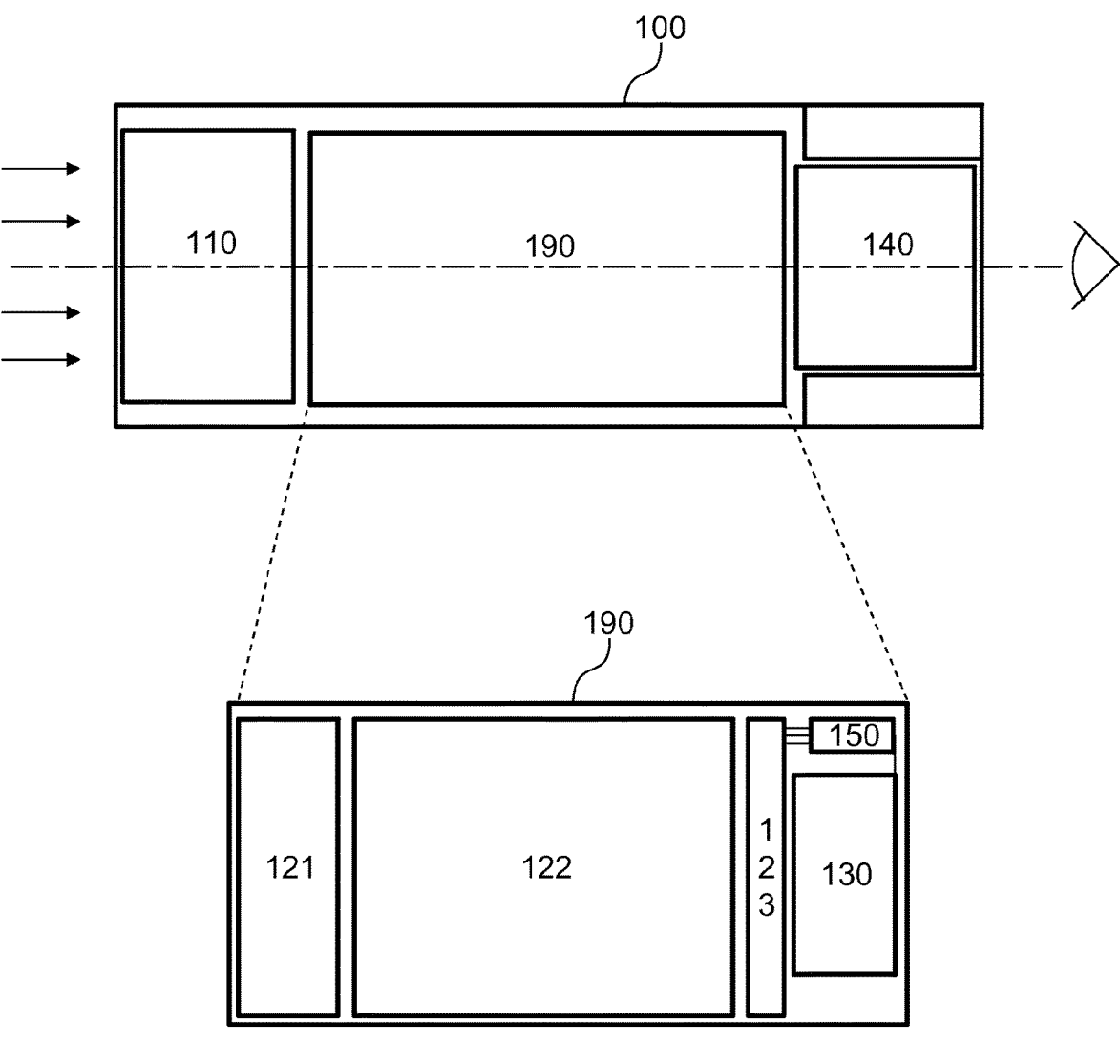
FIG. 1 schematically shows a known night vision device of the state of the art.

It will be eventually understood by those skilled in the art that the invention also concerns a replacement tube, with an integrated display, enabling to easily retrofit a conventional night vision device, such as that shown in FIG. 1, into a night vision device such as shown in FIGS. 2A-2D.

More precisely, this integrated display tube substitutes to a standard tube in the night vision device. The integrated display tube comprises a photocathode, a microchannel wafer, a phosphor screen, a light guide at the output thereof intended to form an image in the focal plane of the eyepiece lens. It further comprises a power supply and control module intended to be housed within the tube body, at the periphery of the light guide, to deliver the respective bias voltages of the photocathode, of the light intensifier, and of the phosphor screen and control the light-emitting elements of the display.

The invention claimed is:

1. A night vision device comprising a binocular body in which are mounted, along an optical axis, an objective lens, a light intensifier tube, and an eyepiece lens, the light intensifier tube comprising a photocathode receiving light having crossed the objective lens and converting the photons thus received into photoelectrons, a microchannel wafer multiplying the photoelectrons received from the photocathode by generating secondary electrons, a phosphor screen delivering a night vision image based on the secondary electrons impacting it, a light guide having an input side contiguous to the phosphor screen and an output side forming an image in the focal plane of the eyepiece lens, wherein the light intensifier tube further comprises a display in the form of a thin glass plate or of a thin film comprising light-emitting elements, the thin plate/the thin film being directly arranged on the output side of the light guide, a power supply and control module, located within the light intensifier tube, at the periphery of the light guide, delivering respective bias voltages of the photocathode, of the light intensifier, and of the phosphor screen and controlling the light-emitting elements of the display.

2. The night vision device according to claim 1, wherein the light guide is formed by a glass block or by a bundle of optical fibers bonded to one another.

3. The night vision device according to claim 2, wherein the light-emitting elements appear in the form of segments.

4. The night vision device according to claim 3, wherein the display is formed by bonding of a glass plate on at least a portion of the output side, phosphor segments being deposited on the thin plate and individually addressable by conductive tracks.

5. The night vision device according to claim 1, wherein the display is formed by deposition of a film on at least a portion of the output side, planar or planarized, the deposition being performed by an atomic layer deposition technique.

6. The night vision device according to claim 5, wherein the thin film comprises a first dielectric layer, a light-emitting film, and a second dielectric layer, the assembly formed by the first dielectric layer, the light-emitting film, and the second dielectric layer being sandwiched between a first array of electrodes arranged in the form of columns and a second array of transparent electrodes organized in rows, orthogonal to the first array.

7. The night vision device according to claim 1, wherein the power supply and control module appears in the form of two distinct units, a first unit having the function of delivering respective high bias voltages of the photocathode, of the microchannel wafer, and of the phosphor screen and a second unit having the function of controlling the display.

8. The night vision device according to claim 7, further comprising a communication module coupled to the second unit by means of a bus, said communication module having a wireless radio interface, and delivering information to be displayed to the second unit via said bus, said first unit transmitting to the second unit a signal for controlling the luminance of the light-emitting elements to be displayed.

9. The night vision device according to claim 8, further comprising a power supply module powering with a low voltage the first and second units, the first unit comprising a voltage multiplier for generating said high bias voltages based on said low voltage.

10. The night vision device according to claim 9, wherein the first unit measures an anode current of the phosphor screen and supplies this measurement to the second unit, the second unit controlling a voltage and/or a duty cycle of a signal for biasing the light-emitting elements, to limit a ratio of a luminance of the elements thus displayed to a luminance of the night vision image, to a level within a range of predetermined values.

11. The night vision device according to claim 10, wherein the second unit controls the voltage and/or the duty cycle of the signal for biasing the light-emitting elements so that the luminance of the elements varies in successive stages, a variation of the luminance of the light-emitting elements following in delayed fashion the variation of the luminance of the night vision image when the latter increases or decreases.

12. The night vision device according to claim 10, wherein the second unit controls the voltage and/or the duty cycle of the signal for biasing the light-emitting elements so that the luminance of the elements is proportional to the anode current filtered by means of a recursive low-pass filter.

13. The night vision device according to claim 1, wherein the power supply and control module is an integrated unit, delivering the respective bias voltages of the photocathode, of the microchannel wafer, and of the phosphor screen, and controlling the display.

14. The night vision device according to claim 13, wherein said integrated unit is adapted to controlling the voltage and/or the duty cycle of the signal for biasing the light-emitting elements so that the luminance thereof is proportional to the anode current filtered by means of a recursive low-pass filter.

15. A replacement light intensifier tube intended to retrofit a night vision device, said night vision device comprising a binocular body in which are mounted, along an optical axis, an objective lens, a light intensifier tube, and an eyepiece lens, said replacement light intensifier tube replacing the light intensifier tube and comprising a photocathode, receiving light having crossed the objective lens and converting the photons thus received into photoelectrons, a microchannel wafer multiplying the photoelectrons received from the photocathode by generating secondary electrons, a phosphor screen delivering a night vision image based on the secondary electrons impacting it, a light guide having an input side contiguous to the phosphor screen and an output side forming an image in the focal plane of the eyepiece lens, a display in the form of a thin glass plate or of a thin film comprising light-emitting elements, the thin plate/the thin film being directly arranged on the output side of the light guide, said replacement light intensifier tube further comprising a power supply and control module housed within the tube body, at the periphery of the light guide, and delivering respective bias voltages of the photocathode, of the light intensifier tube, and of the phosphor screen controlling the light-emitting elements of the display.

\* \* \* \* \*